(12) United States Patent
Hirunuma et al.

(10) Patent No.: US 7,092,155 B2
(45) Date of Patent: Aug. 15, 2006

(54) OPTICAL DEVICE

(75) Inventors: Ken Hirunuma, Tokyo (JP); Keiichi Hotta, Tokyo (JP); Gouji Funatsu, Saitama (JP)

(73) Assignee: PENTAX Corporation, Tokyo (JP)

( * ) Notice: Subject to any disclaimer, the term of this patent is extended or adjusted under 35 U.S.C. 154(b) by 100 days.

(21) Appl. No.: 10/414,005

(22) Filed: Apr. 16, 2003

(65) Prior Publication Data

US 2003/0197928 A1    Oct. 23, 2003

(30) Foreign Application Priority Data

Apr. 17, 2002    (JP)    ............ P2002-114481

(51) Int. Cl.
 G02B 23/00    (2006.01)
 G02B 7/02     (2006.01)
 G03B 17/00    (2006.01)

(52) U.S. Cl. .............. 359/407; 359/819; 396/419

(58) Field of Classification Search ........ 359/407–422, 359/800–830, 894; 396/419–433, 535; 248/176–188
See application file for complete search history.

(56) References Cited

U.S. PATENT DOCUMENTS

| 4,067,027 A | | 1/1978 | Yamazaki ............ 396/432 |
| 4,570,887 A | * | 2/1986 | Banister ............. 248/187.1 |
| 5,081,478 A | * | 1/1992 | Hayashida et al. ...... 396/425 |
| 5,092,458 A | * | 3/1992 | Yokoyama ............ 206/316.2 |
| 5,583,692 A | | 12/1996 | Funatsu ............. 359/422 |
| 5,631,699 A | * | 5/1997 | Saito ............... 348/211.6 |
| 5,666,582 A | * | 9/1997 | Nakai et al. .......... 396/419 |
| 6,014,253 A | | 1/2000 | Funatsu ............. 359/418 |
| 6,021,983 A | * | 2/2000 | Congdon ............ 248/187.1 |
| 6,088,053 A | | 7/2000 | Hammack et al. ........ 348/61 |
| 6,791,769 B1 | * | 9/2004 | Takeda ............. 359/819 |
| 2001/0028498 A1 | | 10/2001 | Haga et al. ........... 359/407 |

FOREIGN PATENT DOCUMENTS

| GB | 2380266 | 4/2003 | |
| JP | 62330 | 1/1994 | |
| JP | 2000-29112 | * 1/2000 | ............ 359/829 |
| JP | 2001281555 | 10/2001 | |
| WO | 01/52531 | 7/2001 | |

OTHER PUBLICATIONS

Webster's II Dictionary, front page and p. 430.*
English Language Translation of JP Appln. No. 6-2330.

* cited by examiner

*Primary Examiner*—Thong Q Nguyen
(74) *Attorney, Agent, or Firm*—Greenblum & Bernstein, P.L.C.

(57) ABSTRACT

An optical device includes an optical system mount plate, a casing, and a screw-hole forming part. An optical system is mounted on the optical system mount plate. The optical system mount plate is housed in the casing. The screw-hole forming part is provided on a bottom of the casing such that a screw provided on a tripod head can threadedly fit in the screw-hole forming part. The screw-hole forming part and at least one portion of the bottom are engaged with the optical system mount plate so as to counteract a rotational tightening force that is applied to the screw-hole forming part when the screw is threadedly tighten in the screw-hole forming part.

20 Claims, 10 Drawing Sheets

OPTICAL DEVICE

BACKGROUND OF THE INVENTION

1. Field of the Invention

The present invention relates to an optical device having an optical system mount plate, on which an optical system is mounted, and a casing, in which the optical system mount plate is housed, and more particularly to an optical device in which a bottom of the casing is provided with a screw-hole forming part which is threadingly fit on a screw provided on a tripod head.

2. Description of the Related Art

As examples of optical devices, there are a binocular telescope, a camera, and so on. In these optical devices, an optical system mount plate is housed in the casing, and an optical system, such as an observation optical system and a camera, is mounted on the optical system mount plate. The optical device is usually designed to be fixed on a tripod head. Namely, a screw-hole forming part is provided on a bottom of the casing, and is threadingly fit on a screw of the tripod head, so that the optical device is attached on the tripod.

On the other hand, the optical device is required to be light weight. Therefore, aluminum, aluminum alloy, and reinforced plastic are used as material for the casing, and the thickness of the casing is required to be as thin as possible. Usually, the screw-hole forming part is integrally formed on the bottom of the casing, and has a large thickness so as to form a screw hole.

When the optical device is attached to the tripod head, it is often the case that excessive rotational force is exerted on the screw-hole forming part by tightening the screw of the tripod head to the screw-hole forming part. Due to this excessive rotational force, excessive stress occurs in the bottom of the casing, so that the casing may be deformed.

Thus, for lightening the weight of the optical device as a whole, it is desirable to reduce the thickness of the casing. However, for preventing deformation of the casing from occurring, because of the excessive stress when attaching the optical device onto the tripod head, it is not possible to reduce the thickness of the casing too much.

SUMMARY OF THE INVENTION

Therefore, an object of the present invention is to provide an optical device, which is constructed in such a manner that stress, occurring in the casing when attaching the optical device to a tripod head, is reduced while keeping the thickness of the casing relatively thin.

According to the present invention, there is provided an optical device an optical system mount plate, a casing, and a screw-hole forming part. An optical system is mounted on the optical system mount plate. The optical system mount plate is housed in the casing. The screw-hole forming part is provided on a bottom of the casing so as to threadingly fit on a screw provided on a tripod head. The screw-hole forming part and at least one portion of the bottom are engaged with the optical system mount plate so as to counteract a rotational tightening force that is affected on the screw-hole forming part when the screw is threadingly tightened in screw-hole forming part.

Preferably, the screw-hole forming part is provided with a first pin, and the bottom is provided with a second pin positioned at a predetermined distance from the first pin. Tip portions of the first and second pins are engaged with the optical system mount plate.

In this case, the casing may be made of a reinforced plastic material, and the screw-hole forming part, the first and second pins, and the casing may be integrally formed. Further, the first and second pins may be provided with protrusions at the tip portions thereof, and the protrusions may be fit in holes formed in the optical system mount plate, so that the first and second pins are engaged with the optical system mount plate.

Optionally, the center of the protrusion of the first pin is aligned with the center of the screw-hole forming part.

The optical device may further comprise a pair of telescopic optical systems mounted on the optical system mount plate, so that the optical device can serve as a binocular telescope. In this case, the casing may comprise a main casing section and a movable casing section engaged with the main casing section so as to be movable to expand and contract relative to the main casing section. The optical system mount plate may comprise a first plate fixed on a side of the main casing section and a second plate fixed on a side of the movable casing section. One of the pair of telescopic optical systems may be mounted on the first plate, and the other of the pair of telescopic optical systems may be mounted on the second plate. The movable casing section may be moved relative to the main casing section so that the distance between the optical axes of the pair of telescopic optical systems is adjusted, and the screw-hole forming part may be provided in the main casing section.

Preferably, the movable casing section is linearly moved relative to the main casing section in such a manner that the optical axes of the pair of telescopic optical systems are moved in a predetermined plane, so that the distance between the optical axes of the pair of telescopic optical systems is adjusted. Each of the telescopic optical systems may comprise a first optical system part fixed at a predetermined position on one of the first and second plates, and a second optical system part movable along the optical axis of the telescopic optical system relative to the first optical system part, so that each of the telescopic optical systems is provided with a focusing function.

Optionally, the main casing section is provided with a focusing mechanism for moving the second optical system part relative to the first optical system part, and a rotary wheel for manually operating the focusing mechanism to perform the focusing function. The rotary wheel may have an annular projection formed on an outer surface of a rotary wheel cylinder, and the focusing mechanism may form a movement-conversion mechanism that converts a rotational movement of the rotary wheel into a linear movement of the second optical system part relative to the first optical system part.

The optical device may further comprise a photographing optical system provided in the rotary wheel. In this case, the optical device may further comprise a lens barrel, which houses the photographing optical system, and which is provided in the rotary wheel cylinder and is movable along the optical axis of the photographing optical system to perform the focusing function, and where the focusing mechanism may be provided between the rotary wheel and the lens barrel. In this case, the screw-hole forming part may be disposed in such a manner that the central axis of the hole of the screw forming part is perpendicular to the optical axis of the photographing optical system. The first and second pins may be arranged parallel to the optical axis of the photographing optical system.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention will be described below with reference to the embodiments shown in the drawings.

Figure 1:
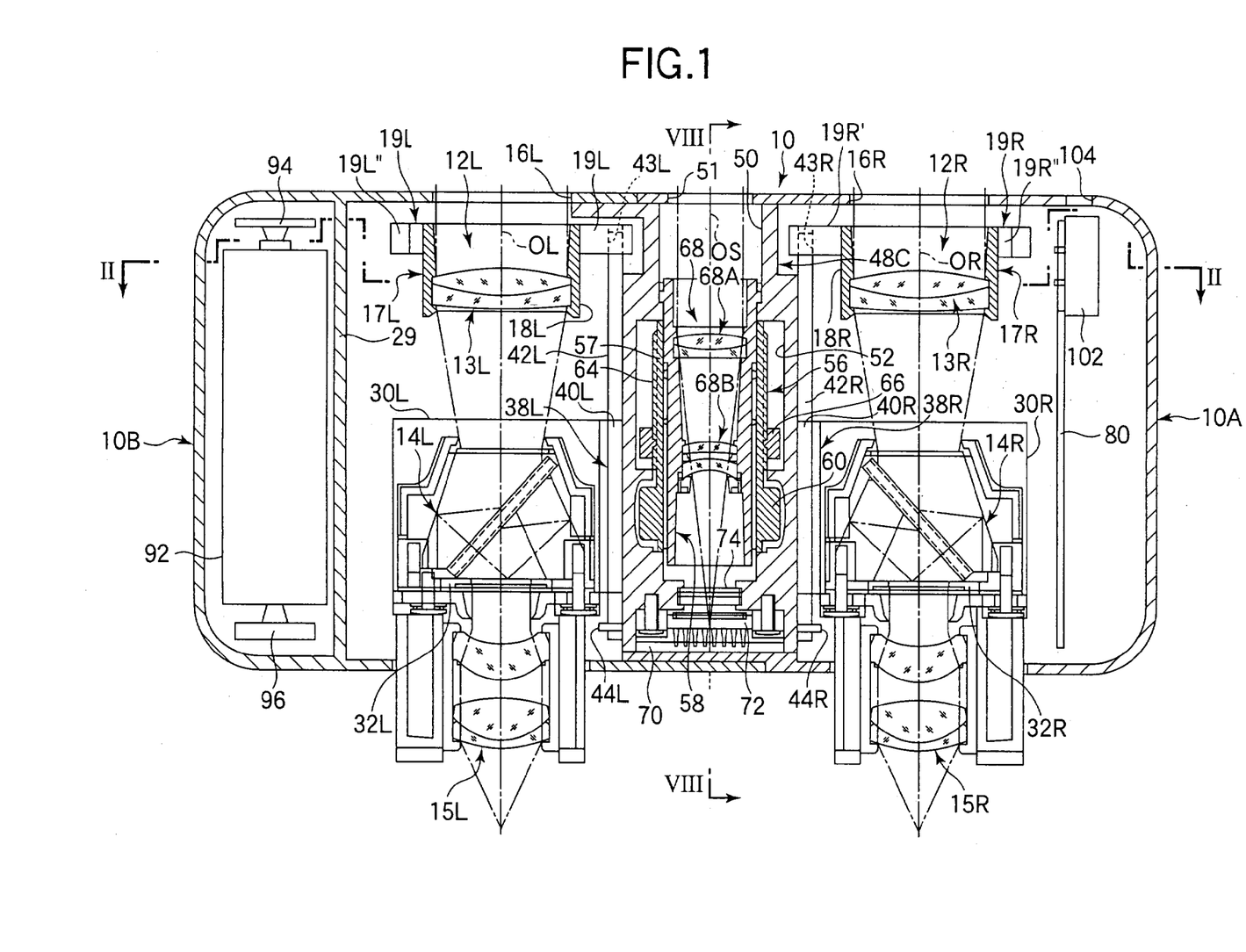
FIG. 1 is a horizontal sectional view showing an embodiment of an optical device according to the present invention, in a state in which a movable casing section is set at a retracted position.
Figure 2:
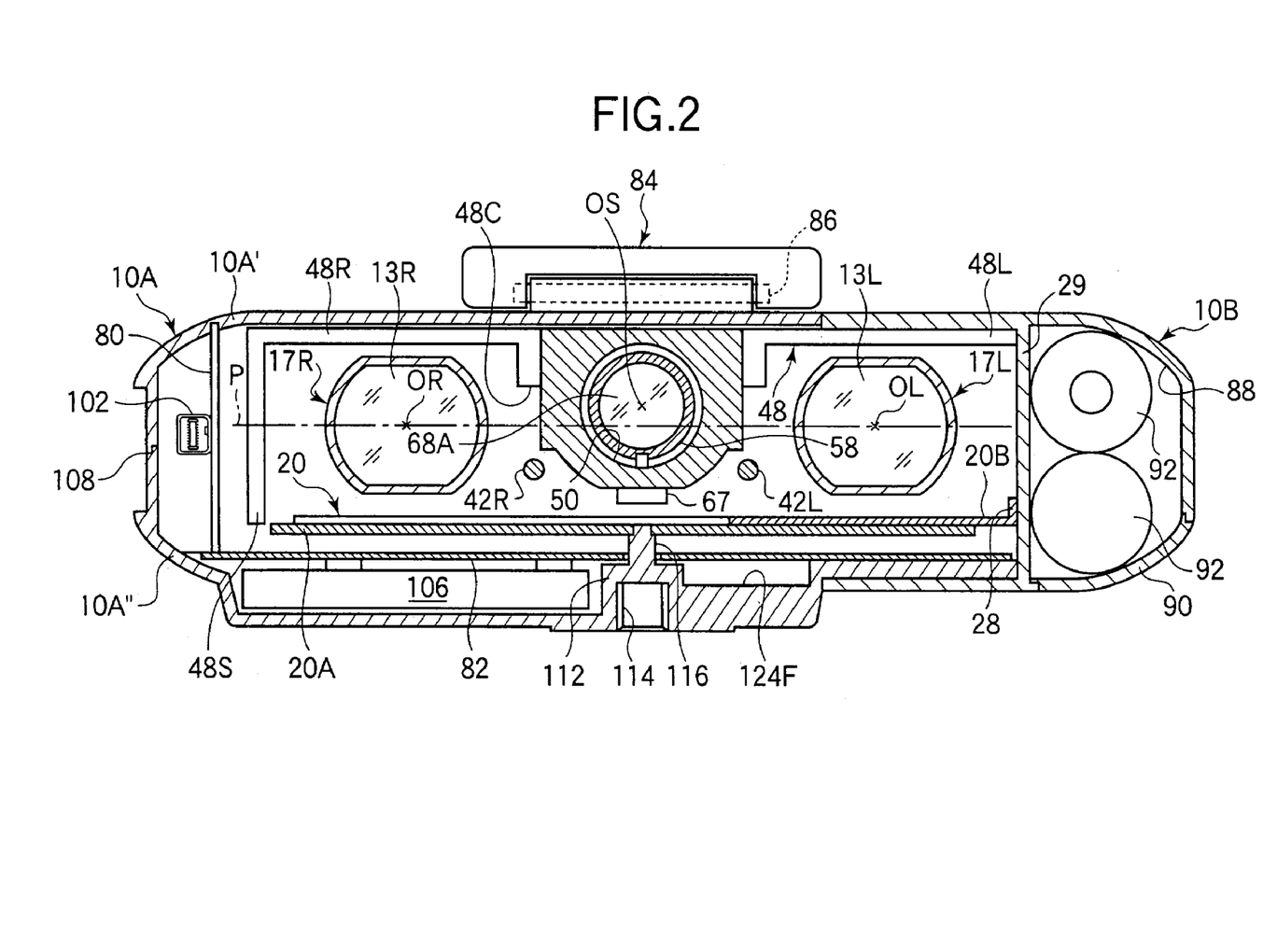
FIG. 2 is a sectional view along line II—II of FIG. 1.

FIG. 1 shows an internal structure of an optical device, to which an embodiment of the present invention is applied, the optical device being a binocular telescope with a photographing function. FIG. 2 is a sectional view along line II—II of FIG. 1, and in FIG. 2, some elements are omitted so as to simplify the drawing. In the embodiment, the binocular telescope has a casing 10, which comprises a main casing section 10A and a movable casing section 10B.

A pair of telescopic optical systems 12R and 12L are provided in the casing 10. The telescopic optical systems 12R and 12L have a symmetrical structure, and are used for a right telescopic optical system and a left telescopic optical system. The right telescopic optical system 12R is mounted in the main casing section 10A, and contains an objective lens system 13R, an erecting prism system 14R, and an ocular lens system 15R. An observation window 16R is formed in a front wall of the main casing section 10A, and is aligned with the objective lens system 13R. The left telescopic optical system 12L is mounted in the movable casing section 10B, and contains an objective lens system 13L, an erecting prism system 14L, and an ocular lens system 15L. An observation window 16L is formed in a front wall of the movable casing section 10B, and is aligned with the objective lens system 13L.

Note that for simplicity of explanation, in the following description, front and back are respectively defined as a side of the objective lens system and a side of the ocular lens system, relative to the pair of telescopic optical systems 12R and 12L, and right and left are respectively defined as the right side and the left side when facing the ocular lens systems 15R and 15L.

The movable casing section 10B is slidably engaged with the main casing section 10A such that the movable casing section 10B can be linearly moved relative to the main casing section 10A. Namely, the movable casing section 10B is movable between a retracted position shown in FIGS. 1 and 2, and a maximum-extended position in which the movable casing section 10B is pulled out from the retracted position, shown in FIGS. 3 and 4. A suitable friction force acts on the sliding surfaces of both the casing sections 10A and 10B, and thus a certain extension or contraction force must be exerted on the movable casing section 10B before the movable casing section 10B can be extended from or contracted onto the main casing section 10A. Thus, it is possible for the movable casing section 10B to hold or stay still at an optical position between the fully retracted position (FIGS. 1 and 2) and the maximum-extended position (FIGS. 3 and 4), due to the suitable friction force acting on the sliding surface of both the casing sections 10A and 10B.

Figure 3:
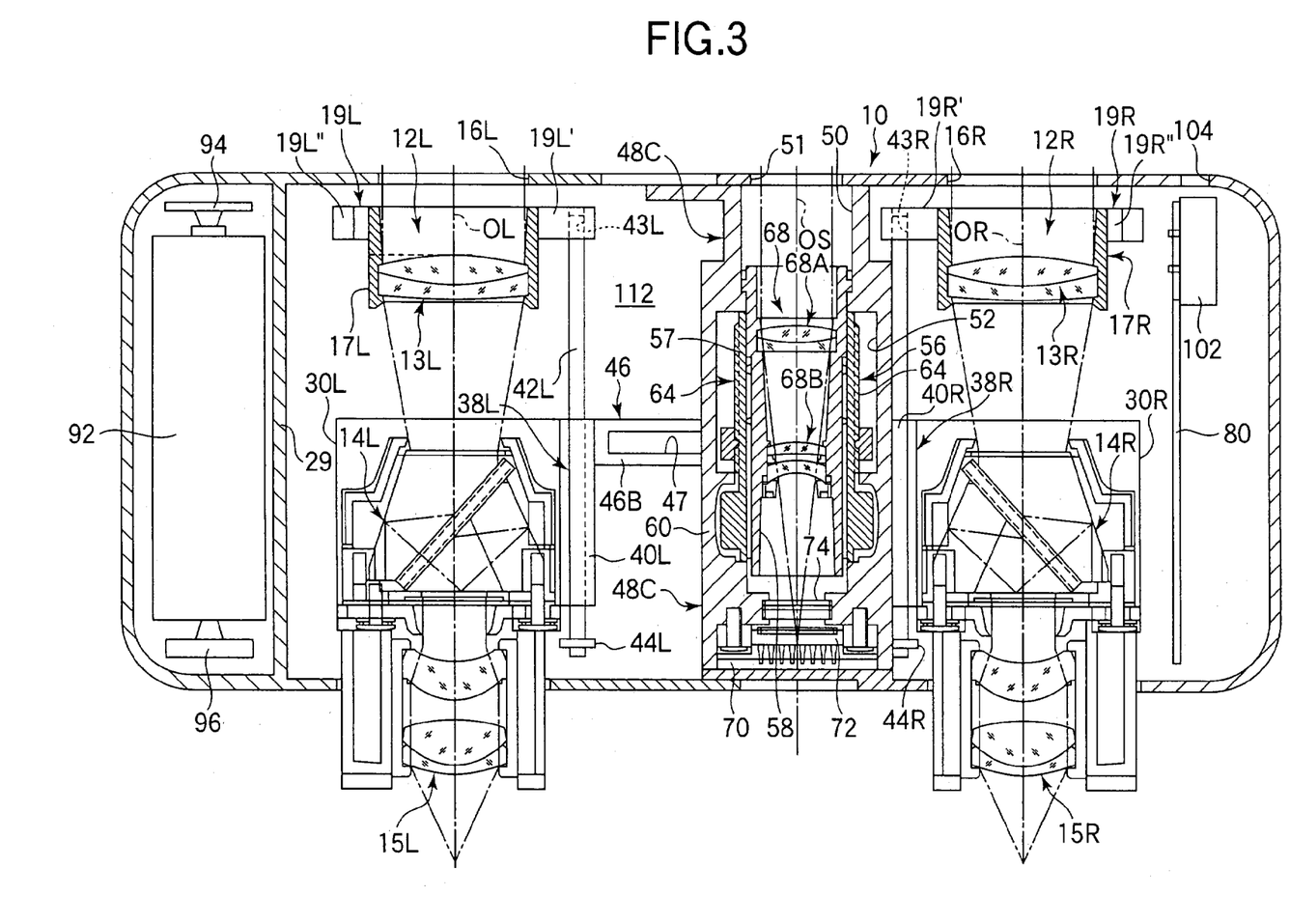
FIG. 3 is a horizontal sectional view similar to FIG. 1, the movable casing section being set at a maximum-extended position.
Figure 4:
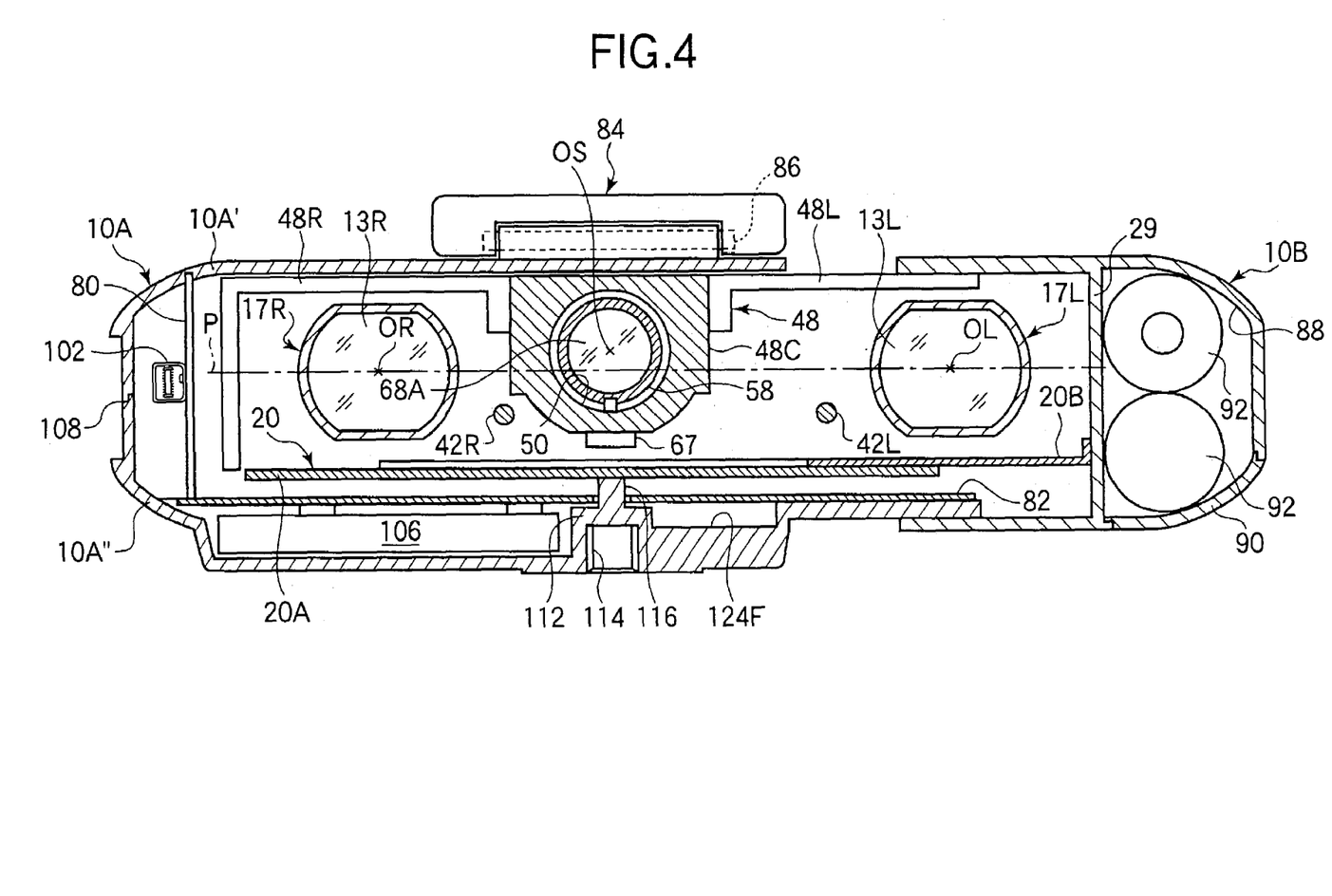
FIG. 4 is a horizontal sectional view similar to FIG. 2, the movable casing section being set at a maximum-extended position.

As understood from the comparison between FIGS. 1 and 2 and FIGS. 3 and 4, when the movable casing section 10B is pulled out from the main casing section 10A, the left telescopic optical system 12L is moved together with the movable casing section 10B, while the right telescopic optical system 12R is held in the main casing section 10A. Thus, by positioning the movable casing section 10B at an arbitrary extended position relative to the main casing section 10A, the distance between the optical axes of the ocular lens systems 15R and 15L, i.e., the interpupillary distance is adjusted. When the movable casing section 10B is set at the retracted position relative to the main casing section 10A, the distance between the telescopic optical systems 12R and 12L becomes the minimum (FIGS. 1 and 2), and when the movable casing section 10B is set at the maximum-extended position relative to the main casing section 10A, the distance between the telescopic optical systems 12R and 12L becomes the maximum (FIGS. 3 and 4).

The objective lens system 13R of the right telescopic optical system 12R is housed in a lens barrel 17R, which is mounted at a fixed position relative to the main casing section 10A, and the erecting prism system 14R and the ocular lens system 15R can be moved back and forth with respect to the objective lens system 13R, so that the right telescopic optical system 12R can be focused. Similarly, the objective lens system 13L of the left telescopic optical system 12L is housed in a lens barrel 17L, which is mounted at a fixed position relative to the movable casing section 10B, and the erecting prism system 14L and the ocular lens system 15L can be moved back and forth with respect to the objective lens system 13L, so that the left telescopic optical system 12L can be focused.

The lens barrel 17R has a cylindrical portion 18R, in which the objective lens system 13R is housed, and an attaching base 19R integrally formed under the cylindrical portion 18R. The attaching base 19R has an inside attaching portion 19R' extending toward the center of the casing 10 from the cylindrical portion 18R, and an outside attaching portion 19R" extending toward the outside of the casing 10 from the cylindrical portion 18R. The inside attaching portion 19R' is a side block portion having a relatively large thickness, and the outside attaching portion 19R" is a flat portion.

Similarly, the lens barrel 17L has a cylindrical portion 18L, in which the objective lens system 13L is housed, and an attaching base 19L integrally formed under the cylindrical portion 18L. The attaching base 19L has an inside attaching portion 19L extending toward the center of the casing 10 from the cylindrical portion 18L, and an outside attaching portion 19L" extending toward the outside of the casing 10 from the cylindrical portion 18L. The inside attaching portion 19L' is a side block portion having a relatively large thickness, and the outside attaching portion 19L" is a flat portion.

Figure 5:
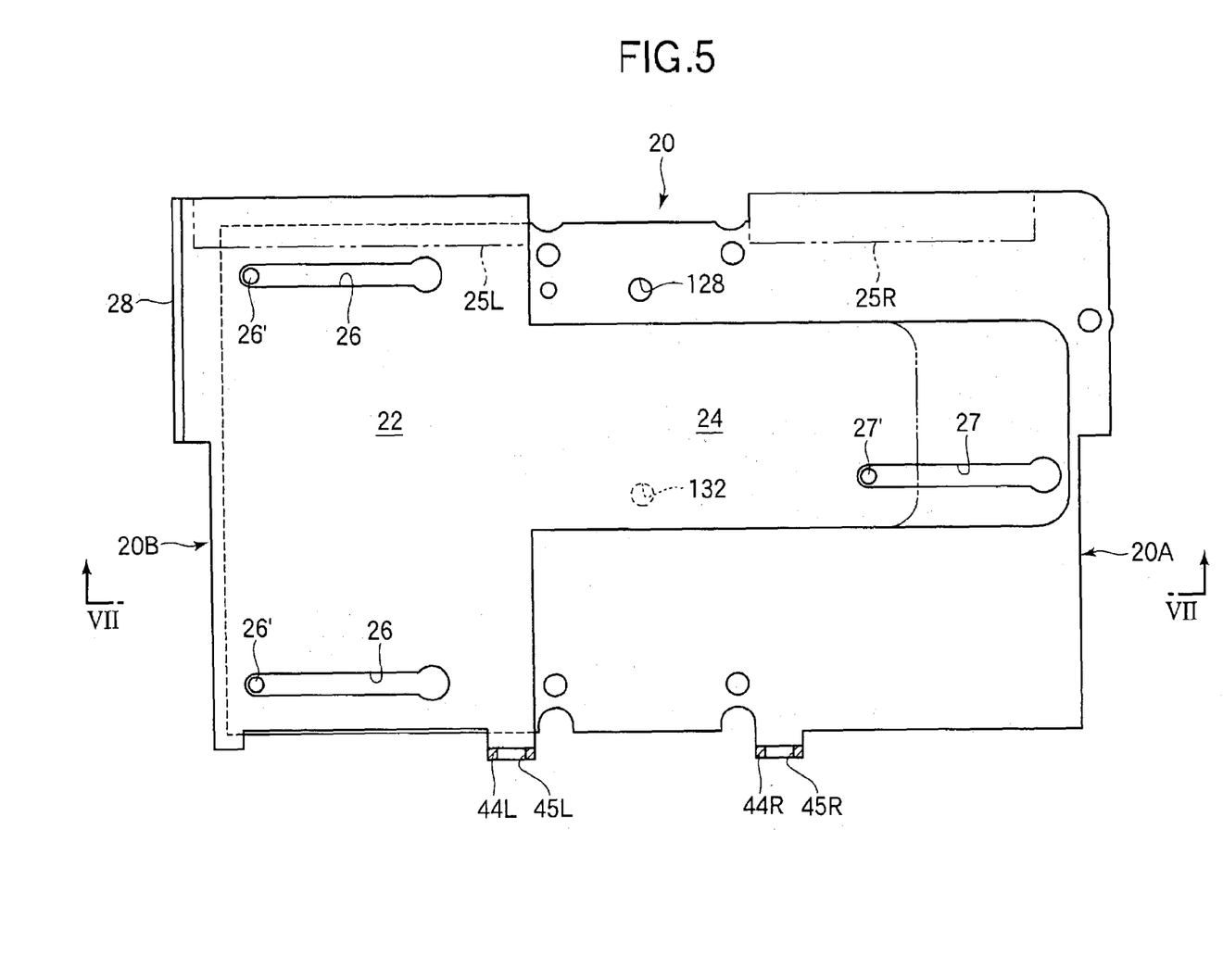
FIG. 5 is a plan view showing an optical system mount plate provided in a casing of the optical device shown in FIG. 1.

To perform the interpupillary distance adjusting operation and the focusing operation described above, an optical system mount plate 20 shown in FIG. 5 is provided on a bottom side of the casing 10. Note that, in FIGS. 1 and 3, the optical system mount plate 20 is omitted for the simplicity of the drawings.

The optical system mount plate 20 is composed of a rectangular plate 20A, fixed to the main casing section 10A, and a slide plate 20B slidably disposed on the rectangular plate 20A and fixed to the movable casing section 10B. The rectangular plate 20A and the slide plate 20B are made of appropriate metal material, preferably, a light metal, such as aluminum or aluminum alloy. Namely, the optical system mount plate 20 is made of material having a higher strength than that of the casing 20 (or a screw-hole forming part 112 described later).

The slide plate 20B has a rectangular portion 22, having approximately the same breadth as the rectangular plate 20A, and an extending portion 24, integrally connected to and extending rightward from the rectangular portion 22. The attaching base 19R of the lens barrel 17R is fixed at a predetermined position on the rectangular plate 20A, and the attaching base 19L of the lens barrel 17L is fixed at a predetermined position on the rectangular portion 22 of the rectangular plate 20B. Note that, in FIG. 5, the fixed position of the attaching base 19R of the lens barrel 17R is indicated as an area enclosed by chain double-dashed line 25R, and the fixed position of the attaching base 19L of the lens barrel 17L is indicated as an area enclosed by chain double-dashed line 25L.

A pair of guide slots 26 are formed in the rectangular portion 22 of the slide plate 20B, and another guide slot 27 is formed in the extending portion 24. A pair of guide pins 26', slidably engaged with the guide slots 26, and guide pin 27', slidably engaged with the guide slot 27, are fixed on the rectangular plate 20A. The guide slots 26 and 27 are parallel to each other, and extend in the right and left direction by the same length. The length of each of the guide slots 26 and 27 corresponds to a movable distance of the movable casing section 10B relative to the main casing section 10A, i.e., the distance between the retracted position of the movable casing section 10B (FIGS. 1 and 2) and the maximum-extended position of the movable casing section 10B (FIGS. 3 and 4).

As understood from FIGS. 2 and 4, the optical system mount plate 20 is placed in the casing 10, and separated from the bottom of the casing 10 to form a space therein. The rectangular plate 20A is fixed to the main casing section 10A, and the slide plate 20B is fixed to the movable casing section 10B. Note that, for fixing the slide plate 20B to the movable casing section 10B, a flange 28, extending along the left side edge of the rectangular portion 22, is provided, and fixed on a partition 29 formed in the movable casing section 10B.

Figure 6:
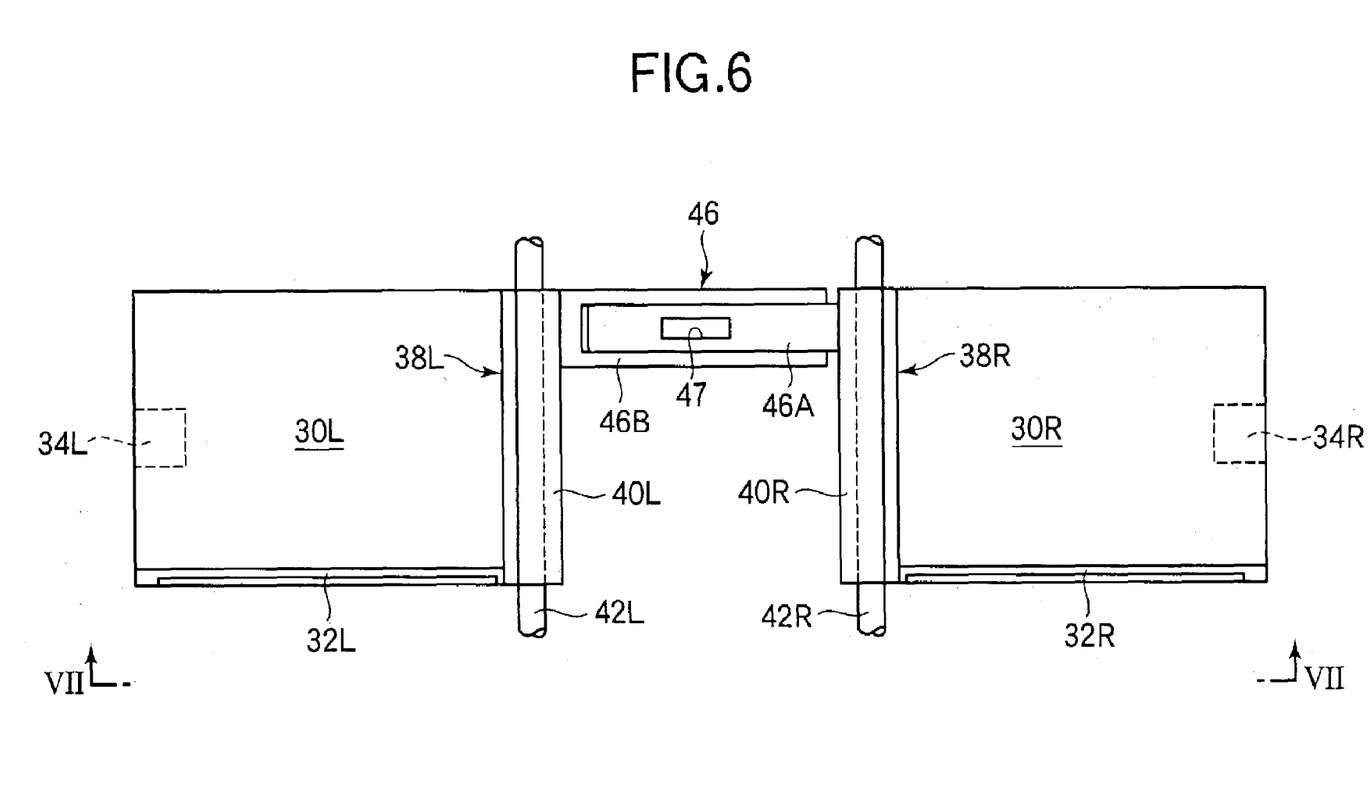
FIG. 6 is a plan view showing right and left mount plates which are disposed on the optical system mount plate shown in FIG. 5.
Figure 7:
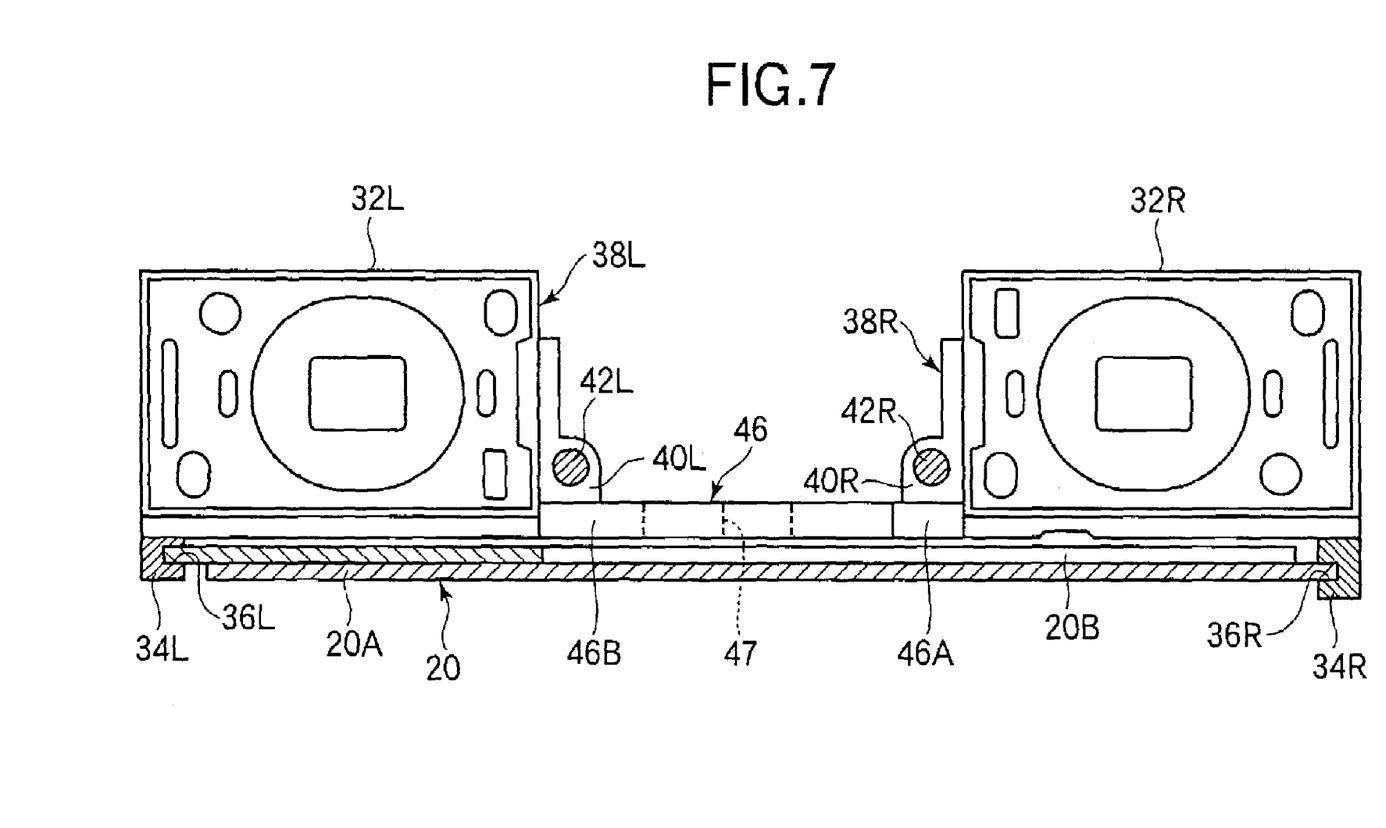
FIG. 7 is an elevational view observed along line VII—VII of FIG. 6, in which the optical system mount plate is indicated as a sectional view along line VII—VII of FIG. 5.

FIGS. 6 and 7 show a right mount plate 30R and a left mount plate 30L. The right mount plate 30R is provided for mounting the erecting prism system 14R of the right telescopic optical system 12R, and the left mount plate 30L is provided for mounting the erecting prism system 14L of the left telescopic optical system 12L. Upright plates 32R and 32L are provided along the rear peripheries of the right and left mount plates 30R and 30L. As shown in FIGS. 1 and 3, the right ocular lens system 15R is attached to the upright plate 32R, and the left ocular lens system 15L is attached to the upright plate 32L.

As shown in FIGS. 6 and 7, the right mount plate 30R is provided with a guide shoe 34R secured to the underside thereof in the vicinity of the right side edge thereof. The guide shoe 34R is formed with a groove 36R, which slidably receives a right side edge of the rectangular plate 20A, as shown in FIG. 7. Similarly, the left mount plate 30L is provided with a guide shoe 34L secured to the underside thereof in the vicinity of the left side edge thereof. The guide shoe 34L is formed with a groove 36L, which slidably receives a right side edge of the rectangular plate 20B, as shown in FIG. 7.

Note that since FIG. 7 is a sectional view along line VII—VII of FIG. 6, the optical system mount plate 20 should not be indicated in FIG. 7. Nevertheless, for the simplicity of the explanation, in FIG. 7, the optical system mount plate 20 is indicated as a section along line VII—VII of FIG. 5, and the guide shoes 34R and 34L are indicated as sectional views.

As shown in FIGS. 6 and 7, the right mount plate 30R has a side wall 38R provided along a left side edge thereof, and a lower portion of the side wall 38R is formed as a swollen portion 40R having a through bore for slidably receiving a guide rod 42R. The front end of the guide rod 42R is inserted in a hole 43R formed in the inside attaching portion 19R' of the attaching base 19R, and is fixed thereto. The rear end of the guide rod 42R is inserted in a hole 45R formed in an upright fragment 44R integrally formed on a rear edge of the rectangular plate 20A, and is fixed thereto (see FIG. 5). Note that, in FIG. 5, the upright fragment 44R is indicated as a sectional view so that the hole 45R is observed, and in FIGS. 1 and 3, the rear end of the guide rod 42R is inserted in the hole 45R of the upright fragment 44R.

Similarly, the left mount plate 30L has a side wall 38L provided along a right side edge thereof, and a lower portion of the side wall 38L is formed as a swollen portion 40L having a through bore for slidably receiving a guide rod 42L. The front end of the guide rod 42L is inserted in a hole 43L formed in the inside attaching portion 19L' of the attaching base 19L, and is fixed thereto. The rear end of the guide rod 42L is inserted in a hole 45L formed in an upright fragment 44L integrally formed on a rear edge of the rectangular plate 20B, and is fixed thereto. Note that, similarly to the upright fragment 44R, in FIG. 5, the upright fragment 44L is indicated as a sectional view so that the hole 45L is observed, and in FIGS. 1 and 3, the rear end of the guide rod 42L is inserted in the hole 45L of the upright fragment 44L.

The objective lens system 13R of the right telescopic optical system 12R is disposed at a stationary position in front of the right mount plate 30R. Therefore, when the right mount plate 30R is moved back and forth along the guide rod 42R, the distance between the objective lens system 13R and the erecting prism system 14R is adjusted, so that a focusing operation of the right telescopic optical system 12R is performed. Similarly, since the objective lens system 13L of the left telescopic optical system 12L is disposed at a stationary position in front of the left mount plate 30L, by moving the left mount plate 30L back and forth along the guide rod 42L, the distance between the objective lens system 13L and the erecting prism system 14L is adjusted, so that a focusing operation of the left telescopic optical system 12L is performed.

In order to simultaneously move the right and left mount plates 30R and 30L along the guide rods 42R and 42L such that a distance between the right and left mount plates 30R and 30L is variable, the mount plates 30R and 30L are interconnected to each other by an expandable coupler 46, as shown in FIGS. 6 and 7.

In particular, the expandable coupler 46 includes a rectangular lumber-like member 46A, and a forked member 46B in which the lumber-like member 46A is slidably received. The lumber-like member 46A is securely attached to the underside of the swollen portion 40R of the side wall 38R at the forward end thereof, and the forked member 46B is securely attached to the underside of the swollen portion 40L of the side wall 38L at the forward end thereof. Both members 46A and 46B have a length which is greater than the distance of movement of the movable casing section 10B, between its retracted position (FIGS. 1 and 2) and its maximum extended position (FIGS. 3 and 4). Namely, even though the movable casing section 10B is extended from the retracted position to the maximum extended position, slidable engagement is maintained between the members 46A and 46B.

Figure 8:
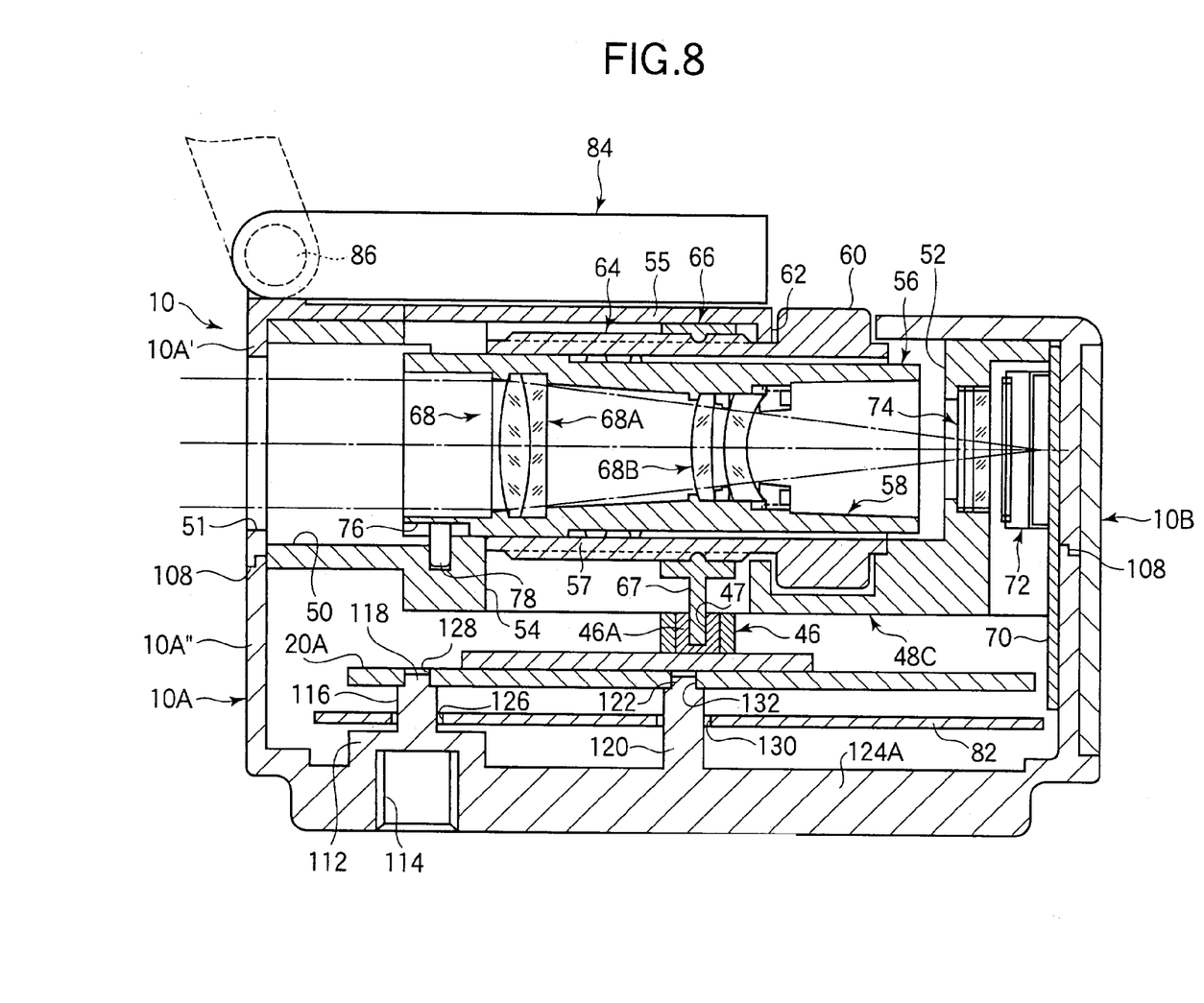
FIG. 8 is an elevational view observed along line VIII—VIII of FIG. 1.

With reference to FIG. 8, there is shown a vertical sectional view along line VIII—VIII of FIG. 1. As understood from FIGS. 2, 4, and 8, an inner frame 48 is housed in the casing 10, and is fixed to the main casing section 10A and the rectangular plate 20A. The inner frame 48 has a central portion 48C, a right wing portion 48R extending from the central portion 48C rightward, a vertical wall 48S extending from a right periphery of the right wing portion 48R downward, and a left wing portion 48L extending from the central portion 48C leftward.

As shown in FIG. 8, a bore 50 is formed in a front end portion of the central portion 48C, and is aligned with a circular window 51 formed in a front wall of the main casing section 10A. A recess 52 is formed in a rear portion in the central portion 48C, and a rectangular opening 54 is formed in a bottom of the recess 52. A top wall of the main casing section 10A is provided with an opening for exposing the recess 52, and the opening is closed by a cover plate 55 which can be removed from the opening.

A tubular assembly 56 is assembled in the recess 52 while the cover plate 55 is removed. The tubular assembly 56 has a rotary wheel cylinder 57 and a lens barrel 58 disposed coaxially in the rotary wheel cylinder 57. The rotary wheel cylinder 57 is rotatably supported in the recess 52, and the lens barrel 58 can be moved along the central axis thereof while the lens barrel 58 is kept still so as not to rotate about the central axis. After assembling the tubular assembly 56, the cover plate 55 is fixed to cover the recess 52. A rotary wheel 60 is provided on the rotary wheel cylinder 57. The rotary wheel 60 has an annular projection formed on an outer surface of the rotary wheel cylinder 57, and the rotary wheel 60 exposes outside the top wall of the main casing section 10A through an opening 62 formed in the cover plate 55.

Helicoids 64 are formed on an outer surface of the rotary wheel cylinder 57, and an annular member 66 is threadingly fit on the helicoids 64. Namely, a plurality of projections, engaged with the helicoids 64 of the rotary wheel cylinder 57, are formed on an inner wall of the annular member 66, and disposed at a constant interval. A flat surface is formed on an outer periphery of the annular member 66, and is slidably engaged with an inner wall of the cover plate 55. Namely, when the rotary wheel cylinder 57 is rotated, the annular member 66 is not rotated due to the engagement of the flat surface and the inner wall of the cover plate 55, and is kept in a non-rotational state. Thus, when the rotary wheel cylinder 57 is rotated, the annular member 66 is moved along the central axis of the rotary wheel cylinder 57 due to the threading contact with the helicoids 64, and the moving direction depends on the rotational direction of the rotary wheel cylinder 57.

A tongue 67 is projected from the annular member 66, and is positioned at an opposite side of the flat surface of the annular member 66. As shown in FIG. 8, the tongue 67 is projected from the rectangular opening 54 of the central portion 48C, and is inserted in a hole 47 formed in the rod member 46A. Therefore, when a user rotates the rotary wheel cylinder 57 by contacting the exposed portion of the rotary wheel 60 with a finger, for example, the annular member 66 is moved along the central axis of the rotary wheel cylinder 57, as described above, so that the mount plates 30R and 30L are moved along the optical axes of the telescopic optical systems 12R and 12L. Thus, the rotational movement of the rotary wheel 60 is transformed into linear movements of the erecting prism systems 14R and 14L, and the ocular lens systems 15R and 15L, so that the telescopic optical systems 12R and 12L can be focused.

In this embodiment, the pair of telescopic optical systems 12R and 12L are designed, for example, in such a manner that, when the distance from each of the erecting prism systems 14R and 14L, and the ocular lens systems 15R and 15L to each of the objective lens systems 13R and 13L is the shortest, the pair of telescopic optical systems 12R and 12L focus on an object located at a distance between 40 meters ahead of the binocular telescope and infinity, and when observing an object between 2 meters and 40 meters ahead of the binocular telescope, the erecting prism systems and the ocular lens systems are separated from the objective lens systems so as to focus on the object. Namely, when the erecting prism systems are separated from the objective lens systems by the maximum distance, the pair of telescopic optical systems focus on an object located at a distance approximately 2 meters ahead of the binocular telescope.

A photographing optical system 68 is provided in the lens barrel 58, which is coaxially disposed in the rotary wheel cylinder 57. The photographing optical system 68 has a first lens group 68A and a second lens group 68B. A circuit board 70 is attached on an inner surface of a rear end wall of the main casing section 10A. A solid-state imaging device such as a CCD 72 is mounted on the circuit board 70, and a light-receiving surface of the CCD 72 is aligned with the photographing optical system 68. An opening is formed in a rear end portion of the central portion 48C of the inner frame 48, and is aligned with the optical axis of the photographing optical system 68. An optical low-pass filter 74 is fit in the opening. Thus, the binocular telescope of this embodiment has the same photographing function as a digital camera, so that an object image obtained by the photographing optical system 68 is formed on the light-receiving surface of the CCD 72 as an optical image, which is photoelectrically converted into one frame's worth of image signals.

In FIGS. 1 through 4, the optical axis of the photographing optical system 68 is indicated by the reference OS, and the optical axes of the right and left telescopic optical systems 12R and 12L are indicated by references OR and OL. The optical axes OR and OL are parallel to each other, and to the optical axis OS of the photographing optical system 68. As shown in FIGS. 2 and 4, the optical axes OR and OL define a plane P which is parallel to the optical axis OS of the photographing optical system 68. The right and left telescopic optical systems 12R and 12L can be moved parallel to the plane P, so that the distance between the optical axes OR and OL, i.e., the interpupillary distance, can be adjusted.

When the photographing optical system 68 is constructed to be able to perform pan-focus photography in which the photographing optical system 68 focuses an object including a near object, which is situated at a predetermined distance ahead of the binocular telescope, and an object at infinity, and a photographing operation is performed only in the pan-focus photography, a focusing mechanism does not need to be mounted in the lens barrel 58. However, when the binocular telescope is required to photograph a near object, which is situated less than 2 meters ahead of the binocular telescope similarly to a usual camera, the lens barrel 58 needs to be provided with a focusing mechanism.

Therefore, a female screw is formed on an inner wall of the rotary wheel cylinder 57, and a male screw, engaged with the female screw of the rotary wheel cylinder 57, is formed on an outer wall of the lens barrel 58. The front end of the lens barrel 58 is inserted in the bore 50, and a bottom portion of the front end is formed with a key groove 76, which extends from the front end of the lens barrel 58 in the longitudinal direction by a predetermined length. A hole is formed in a bottom portion of the front end of the inner frame 48, and a pin 78 is planted in the hole to engage with the key groove 76. Thus, by the engagement of the key groove 76 and the pin 78, the rotation of the lens barrel 58 is prevented.

Therefore, when the rotary wheel cylinder 57 is rotated by an operation of the rotary wheel 60, the lens barrel 58 is moved along the optical axis of the photographing optical system 68. Thus, the female screw formed on the inner wall of the rotary wheel cylinder 57 and the male screw formed on the outer wall of the lens barrel 58 form a movement-conversion mechanism that converts a rotational movement of the rotary wheel 57 into a linear movement or focusing movement of the lens barrel 58.

Helicoids 64 formed on the outer wall of the rotary wheel cylinder 57 and the female screw formed on the inner wall of the rotary wheel cylinder 57 are inclined in the opposite direction to each other so that, when the rotary wheel cylinder 57 is rotated in such a manner that the erecting prism systems 14R and 14L and the ocular lens systems 15R and 15L are separated from the objective lens systems 13R and 13L, the lens barrel 58 is moved to separate from the CCD 72. Due to this, an image of a near object can be focused on the light-receiving surface of the CCD 72. The pitch of the helicoids 64 and the pitch of the female screw of the inner wall are different from each other in accordance with the optical characteristics of the pair of telescopic optical systems 12R and 12L and the photographing optical system 68.

As shown in FIGS. 1 through 4, a power supply circuit board 80 is provided in a right end portion of the main casing section 10A. Since a transformer and so on (not shown) are mounted on the power supply circuit 80, the weight is relatively high. As shown in FIGS. 2, 4, and 8, a control circuit board 82 is provided between the bottom of the main casing section 10A and the optical system mount plate 20, and is fixed on the bottom of the main casing section 10A. Electronic parts such as a micro-computer and a memory are mounted on the control circuit board 82, and the circuit board 70 and the power supply circuit board 80 are connected to the control circuit board 82 through a flat flexible wiring cord (not shown).

In the embodiment, as shown in FIGS. 2, 4, and 8, an LCD monitor 84 is disposed on an upper surface of the top wall of the main casing section 10A. The LCD monitor 84 has a flat rectangular plate shape. The LCD monitor 84 is arranged in such a manner that its front and rear sides, positioned at opposite sides, are perpendicular to the optical axis of the photographing optical system 68, and the LCD monitor 84 is rotatable about a rotational shaft 86 provided along the front side. The LCD monitor 84 is usually folded or closed as shown by a solid line in FIG. 8. In this condition, since the display surface of the LCD monitor 84 faces an upper surface of the main casing section 10A, the display surface cannot be seen. Conversely, when a photographing operation is performed using the CCD 72, the LCD monitor 84 is rotated and raised from the folding position to a display position shown by a broken line in FIG. 8, so that the display surface of the LCD monitor 84 can be seen from the side of the ocular lens systems 15R and 15L.

The left end portion of the movable casing section 10B is divided by the partition 29, to form a battery chamber 88 in which batteries 92 are housed. As shown in FIGS. 2 and 4, a lid 90 is provided in a bottom wall of the battery chamber 88. By opening the lid 90, the batteries 92 can be mounted in or removed from the battery chamber 88. The lid 90 forms a part of the movable casing section 10B, and is fixed at a closing position shown in FIGS. 2 and 4 through a proper engaging mechanism.

The weight of the power supply circuit board 80 is relatively high, and similarly, the weights of the batteries 92 are relatively high. In the embodiment, two components having a relatively large weight are disposed in the both ends of the casing 10. Therefore, the weight balance of the binocular telescope with a photographing function is improved.

As shown in FIGS. 1 and 3, electrode plates 94 and 96 are provided at front and rear portions of the battery chamber 88. The batteries 92 are arranged in parallel to each other in the battery chamber 88, and directed in the opposite directions in the battery chamber to contact the electrode plates 94 and 96. The electrode plate 94 is electrically connected to the casing 10, and the electrode plate 96 is electrically connected to the power supply circuit board 80 through a power source cable (not shown) so that electric power is supplied from the batteries 92 to the power supply circuit board 80. The power supply circuit board 80 supplies electric power to the CCD 72 mounted on the circuit board 70, the electric parts such as the microcomputer and the memory mounted on the control circuit board 82, and the LCD monitor 84.

As shown in FIG. 1 through FIG. 4, it is possible to provide a video output terminal 102, for example, as an external connector, on the power supply circuit board 80, and in this case, a hole 104 is formed in the front wall of the main casing section 10A so that an external connector is connected to the video output terminal 102. Further, as shown in FIGS. 2 and 3, a CF-card driver 106, in which a CF-card can be detachably mounted as a memory card, may be provided below the control circuit board 82 on the bottom of the main casing section 10A.

The main casing section 10A and the movable casing 10B are both made of fiber reinforced plastic material containing carbon fiber, for example, as reinforcement. The main casing section 10A is formed by connecting a top half 10A' and a bottom half 10A", and in FIGS. 2, 4, and 8, the joint between the top half 10A' and the bottom half 10A" is shown by reference 108. The top half 10A' and the bottom half 10A" are molded as integral parts from fiber reinforced plastic material, and bonded with proper adhesive, to form the main casing section 10A.

Figure 9:
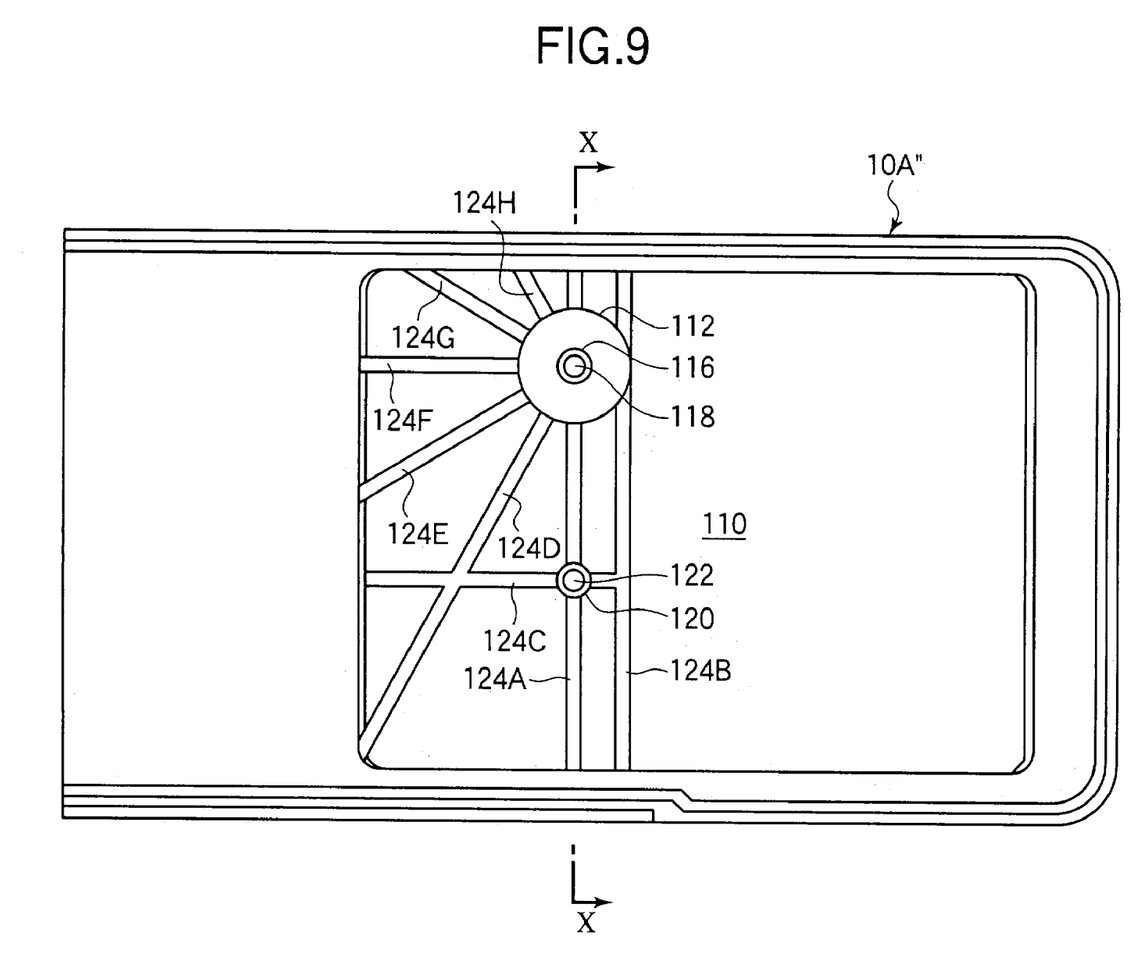
FIG. 9 is a plan view showing a bottom half of a main casing section of the optical device shown in FIG. 1.
Figure 10:
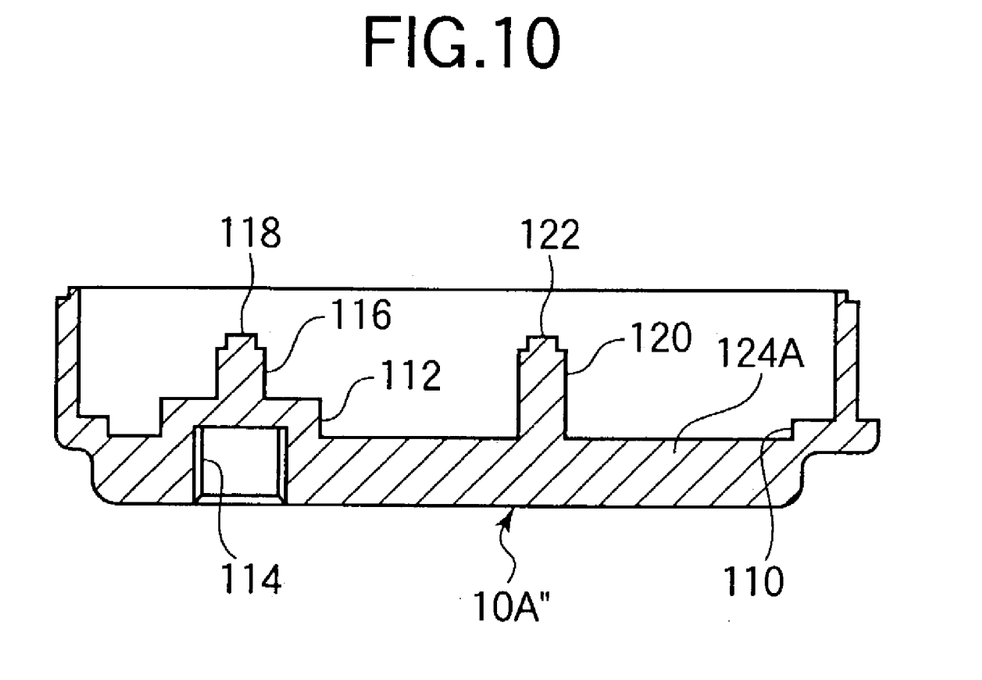
FIG. 10 is a sectional view along line X—X of FIG. 9.

FIG. 9 is a plan view showing the bottom half 10A" of the main casing section 10A, and FIG. 10 is a sectional view along line X—X of FIG. 9.

The bottom half 10A" is provided with a rectangular recess 110, in which a screw-hole forming part 112 is integrally formed at a position, deviating slightly to right side of the center and close to the front edge of the bottom half 10A". The screw-hole forming part 112 is a thick portion having a circular section; and a screw-hole 114, opening to an outer surface of the bottom half 10A", is formed in the thick portion, as shown in FIG. 10. The screw-hole 114 of the screw-hole forming part 112 is connected to a screw attached to a tripod head. A first pin 116 is integrally formed on a tip of the screw-hole forming part 112, and a protrusion 118 is projected from the tip of the first pin 116. The center of the protrusion 118 is aligned with the center of the screw-hole forming part 112. On the other hand, a second pin 120 is integrally formed in the rectangular recess 110 at a position behind and separating from the screw-hole forming part 112 by a predetermined distance. A protrusion 122 is projected from the tip of the second pin 120.

The screw-hole forming part 112 is disposed in such a manner that the central axis of the screw-hole 114 of the screw-hole forming part 112 is perpendicular to the optical axis of the photographing optical system 68. The first and second pins 116 and 120 are projected perpendicular to the optical axis, and are arranged under and parallel to the optical axis of the photographing optical system 68. As shown in FIG. 10, the protrusions 118 and 122 are positioned at the same height from the bottom surface of the rectangular recess 110.

The screw-hole forming part 112 and the pin 120 are integrally formed with the rectangular recess 110 as described above, reinforcing ribs 124A–124H are integrally formed on the rectangular recess 110 for strengthening the connecting portions of the screw-hole forming part 112 and the pin 120 to the bottom half 10A". As understood from FIG. 9, the reinforcing rib 124A is formed to pass through the center of the screw-hole forming part 112 and the pin 120 and extend along the optical axis of the photographing optical system 68. The reinforcing rib 124B is formed to pass the right side of the screw-hole forming part 112 and be parallel to the reinforcing rib 124A. The reinforcing rib 124C is extended leftward from the reinforcing rib 124B, and is perpendicular to and crosses the reinforcing rib 124A. The reinforcing ribs 124D, 124E, 124F, 124G, and 124H are extended in radial directions from the screw-hole forming part 112.

As shown in FIG. 8, when the binocular telescope with a photographing function is assembled, the first pin 116 of the screw-hole forming part 112 is inserted into a through hole 126 formed in the control circuit board 82, and the protrusion 118 is fit in and engaged with an engaging hole 128 formed in the rectangular plate 20A. The second pin 120 is inserted into a through hole 130 formed in the control circuit board 82, and the protrusion 122 is fit in and engaged with an engaging hole 132 formed in the rectangular plate 20A.

When the binocular telescope with a photographing function is mounted on a tripod head, the screw-hole 114 of the screw-hole forming part 112 is threadingly fit on the screw of the tripod head and tightened. Nevertheless, at this time, even if an excessive rotational tightening force is exerted on the screw-hole forming part 112, the excessive rotational tightening force is received or accumulated by the pins 116 and 120 engaged with the rectangular plate 20A, so that it is prevented that an excessive stress occurs in the bottom of the main casing section 10A. In other words, for lightening the binocular telescope with a photographing function as a whole, even if the wall of the main casing section 10A is made thin, the main casing section 10A is prevented from deforming because of the excessive rotational tightening force-affecting the screw-hole forming part 112.

As understood from FIGS. 2 and 4, the right area of the rectangular recess 110 or the right side of the reinforcing rib 124B is used for housing the CF-card driver 106.

Although the optical device is a binocular telescope with a photographing function in the above embodiment, the present invention can be applied to other optical devices, such as a digital camera. Further, although the main casing section 10A is fixed on the rectangular plate 20A at two portions, i.e., the pin 116 of the screw-hole forming part 112 and the pin 120 in the above embodiment, a pin may be provided on other portions, so that the main casing section 10A can be fixed on the rectangular plate 20A at three portions or more.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2002-114481. (filed on Apr. 17, 2002) which is expressly incorporated herein, by reference, in its entirety.

The invention claimed is:

1. An optical device comprising:
   an optical system mount plate on which an optical system is mounted;
   a casing enclosing said optical system mount plate and the optical system;
   a screw-hole forming part that is provided on a bottom of said casing and including a screw hole configured to receive a screw provided on a tripod head which can threadedly fit in the screw hole of said screw-hole forming part,
   said screw-hole forming part and at least one portion of said bottom of said casing being engaged with said optical system mount plate so as to counteract a rotational tightening force applied to said screw-hole forming part when the screw is threadedly tightened in said screw-hole forming part; and
   a protrusion projecting from said bottom of said casing and extending in an axial direction of the screw hole,
   wherein said protrusion is engaged in a hole formed in the optical system mount plate.

2. A device according to claim 1, further comprising a pair of telescopic optical systems mounted on said optical system mount plate, wherein said optical device comprises a binocular telescope.

3. A device according to claim 2, wherein said casing comprises a main casing section and a movable casing section engaged with said main casing section so as to be movable relative to said main casing section, said optical system mount plate comprises a first plate fixed to a side of said main casing section and a second plate fixed to a side of said movable casing section, one of said pair of telescopic optical systems is mounted on said first plate, the other of said pair of telescopic optical systems is mounted on said second plate, said movable casing section is moved relative to said main casing section so that a distance between optical axes of said pair of telescopic optical systems is adjusted, and said screw-hole forming part is provided in said main casing section.

4. A device according to claim 3, wherein said movable casing section is linearly moved relative to said main casing section in such a manner that the optical axes of said pair of telescopic optical systems are moved in a predetermined plane, whereby the distance between the optical axes of said pair of telescopic optical systems is adjusted.

5. A device according to claim 3, wherein each of said telescopic optical systems comprises a first optical system part fixed at a predetermined position on one of said first and second plates, and a second optical system part movable along the optical axis of said telescopic optical system relative to said first optical system part, whereby each of said telescopic optical systems is capable of focusing.

6. A device according to claim 5, wherein said main casing section is provided with a focusing mechanism configured to move said second optical system part relative to said first optical system part, and a rotary wheel configured to manually operate said focusing mechanism to focus the telescopic optical system.

7. A device according to claim 6, wherein said rotary wheel has an annular projection formed on an outer surface of a rotary wheel cylinder, and said focusing mechanism includes a movement-conversion mechanism that converts a rotational movement of said rotary wheel into a linear movement of said second optical system part relative to said first optical system part.

8. A device according to claim 7, further comprising a photographing optical system provided in said rotary wheel.

9. A device according to claim 8, further comprising a lens barrel, which houses said photographing optical system, and which is provided in said rotary wheel cylinder and is movable along the optical axis of said photographing optical system to perform focusing, and said focusing mechanism is provided between said rotary wheel cylinder and said lens barrel.

10. A device according to claim 1, further comprising a photographing optical system, said screw-hole forming part being disposed in such that a central axis of the screw hole of said screw-hole forming part is perpendicular to an optical axis of said photographing optical system.

11. A device according to claim 1, wherein said optical system mount plate comprises material having a higher strength than a strength of said screw-hole forming part.

12. A device according to claim 11, wherein said optical system mount plate comprises a metal.

13. A device according to claim 1, further comprising:
a binocular telescope including first and second telescopic optical systems;
and a photographing optical system configured to record an image viewable through the binocular telescope.

14. A device according to claim 13, wherein the photographing optical system comprises a charge-coupled device.

15. A device according to claim 13, further comprising:
a focusing mechanism of the photographing optical system; and
a plurality of lenses of the binocular telescope, wherein the focusing mechanism adjusts a focus of the photographing optical system in accordance with an adjustment of the lenses of the binocular telescope, based on a relationship between an optical characteristic of the photographing lens system and an optical characteristic of the binocular telescope.

16. A device according to claim 1, wherein a center of said protrusion is aligned with a center of said screw-hole forming part. system mount plate.

17. An optical device comprising:
an optical system mount plate on which an optical system is mounted;
a casing in which said optical system mount plate is housed; and
a screw-hole forming part that is provided on a bottom of said casing and including a screw hole configured to receive a screw provided on a tripod head which can threadedly fit in the screw hole of said screw-hole forming part,
said screw-hole forming part and at least one portion of said bottom of said casing being engaged with said optical system mount plate so as to counteract a rotational tightening force applied to said screw-hole forming part when said screw is threadedly tightened in said screw-hole forming part,
wherein said screw-hole forming part is provided with a first pin, and said bottom is provided with a second pin positioned spaced from said first pin by a predetermined distance, respective tip portions of said first and second pins being engaged with said optical system mount plate.

18. A device according to claim 17, wherein said casing comprises a reinforced plastic material, and said screw-hole forming part, said first and second pins, and said casing are integrally formed.

19. A device according to claim 17, wherein said first and second pins include first and second respective protrusions at the tip portions of the first and second pins, and
wherein said first and second protrusions are configured to fit in first and second holes in said optical system mount plate, so that said first and second pins are engaged with said optical system mount plate.

20. A device according to claim 17, further comprising a photographing optical system, said first and second pins being arranged parallel to an optical axis of said photographing optical system.

* * * * *